US010334832B2

(12) United States Patent
Noble et al.

(10) Patent No.: US 10,334,832 B2
(45) Date of Patent: Jul. 2, 2019

(54) BOWFISHING REEL

(71) Applicant: Joshua Noble, Las Vegas, NV (US)

(72) Inventors: Joshua Noble, Las Vegas, NV (US); Brett Bennett, Mantua, UT (US); Trevor Mecham, Logan, UT (US)

(73) Assignee: Joshua Noble, Las Vegas, NV (US)

( * ) Notice: Subject to any disclaimer, the term of this patent is extended or adjusted under 35 U.S.C. 154(b) by 214 days.

(21) Appl. No.: 15/433,055

(22) Filed: Feb. 15, 2017

(65) Prior Publication Data

US 2017/0295768 A1    Oct. 19, 2017

Related U.S. Application Data

(63) Continuation-in-part of application No. 29/557,658, filed on Mar. 10, 2016, now Pat. No. Des. 790,657.

(51) Int. Cl.
| | | |
|---|---|---|
| *A01K 89/01* | (2006.01) | |
| *A01K 89/00* | (2006.01) | |
| *A01K 89/015* | (2006.01) | |
| *F41B 5/14* | (2006.01) | |
| *A01K 81/00* | (2006.01) | |

(52) U.S. Cl.
CPC ........ *A01K 89/006* (2013.01); *A01K 89/0102* (2013.01); *A01K 89/0175* (2015.05); *A01K 89/01121* (2015.05); *F41B 5/1488* (2013.01); *A01K 81/00* (2013.01)

(58) Field of Classification Search
CPC .................. A01K 81/00; A01K 89/006; A01K 89/01012; A01K 89/01121; A01K 89/0175
See application file for complete search history.

(56) References Cited

U.S. PATENT DOCUMENTS

| | | | | | |
|---|---|---|---|---|---|
| 3,054,571 | A | * | 9/1962 | Most ................. | A01K 89/0102 242/238 |
| 3,185,405 | A | * | 5/1965 | Dell .................. | A01K 89/0102 242/240 |
| 3,325,115 | A | * | 6/1967 | Sarah ................ | A01K 89/0102 242/238 |
| 3,836,092 | A | * | 9/1974 | Hull .................. | A01K 89/0102 242/238 |
| 3,970,263 | A | * | 7/1976 | Hull .................. | A01K 89/0102 242/311 |
| 4,383,516 | A | | 5/1983 | LaSee | |
| 4,640,470 | A | * | 2/1987 | Ohler ................ | A01K 89/0102 242/238 |

(Continued)

*Primary Examiner* — Emmanuel M Marcelo
(74) *Attorney, Agent, or Firm* — Thorpe North & Western LLP

(57) ABSTRACT

A fishing reel that may be used in connection with bowfishing is disclosed having a housing with a generally cylindrical first portion with an aperture disposed about a center top portion of the cylindrical first portion. The housing has a generally cylindrical second portion disposed about a bottom of the first portion. The second portion of the housing has an outer perimeter that is less than an outer perimeter of the first portion of the housing. A crank arm is disposed about a side of the housing, said crank arm having a mount that is disposed perpendicular to a longitudinal axis of the housing. A handle is disposed about a bottom of the second portion, said handle having a post disposed coaxial with a center of the aperture and a grip coupled to the post and disposed perpendicular to the post.

17 Claims, 6 Drawing Sheets

(56) References Cited

U.S. PATENT DOCUMENTS

| | | | |
|---|---|---|---|
| 4,725,013 A * | 2/1988 | Epperson | A01K 89/0102 |
| | | | 242/231 |
| 4,924,619 A | 5/1990 | Dowell | |
| 5,149,010 A * | 9/1992 | Bacher | A01K 89/0102 |
| | | | 242/224 |
| 5,388,776 A * | 2/1995 | Childre | A01K 89/0102 |
| | | | 242/239 |
| 5,553,413 A * | 9/1996 | Gannon | A01K 81/00 |
| | | | 43/6 |
| 6,138,935 A * | 10/2000 | Zwayer | A01K 89/0102 |
| | | | 242/238 |
| D443,333 S | 6/2001 | Gibson | |
| 6,375,107 B1 * | 4/2002 | Wong | A01K 89/0102 |
| | | | 242/240 |
| 6,634,350 B2 | 10/2003 | LaSee | |
| 7,290,727 B1 * | 11/2007 | Matsuda | A01K 89/0117 |
| | | | 242/238 |
| D561,868 S | 2/2008 | Wong | |
| D561,869 S | 2/2008 | Wong | |
| 9,043,999 B1 | 6/2015 | Boester | |
| 9,101,119 B2 | 8/2015 | Dunlop et al. | |
| D741,646 S | 10/2015 | Supple | |
| 9,288,973 B1 * | 3/2016 | Zwayer | A01K 89/0102 |
| 9,383,160 B1 * | 7/2016 | White | A01K 89/006 |
| 10,091,977 B2 * | 10/2018 | Braun | A01K 89/006 |
| 2012/0285430 A1 | 11/2012 | Dunlop et al. | |
| 2014/0332615 A1 * | 11/2014 | Braun | A01K 89/0108 |
| | | | 242/236 |
| 2015/0354915 A1 * | 12/2015 | Woods, Jr. | F41B 5/1488 |
| | | | 124/86 |

\* cited by examiner

BOWFISHING REEL

PRIORITY CLAIM

This application is a continuation-in-part, and claims priority to, U.S. Ser. No. 29/557,658 filed on Mar. 10, 2016 entitled "Bowfishing Reel" which is incorporated herein in its entirety by this reference.

FIELD OF THE INVENTION

This invention relates generally to the field of fishing. Specifically, it relates to an improved fishing reel for bowfishing applications though it has substantial non bowfishing uses.

BACKGROUND OF THE INVENTION

In bowfishing, an arrow is fitted with a lightweight line which may pay out behind the arrow when the arrow is shot from a bow. The line allows the arrow and/or fish, to be retrieved after the shot. The line may be stored on a spin casting fishing reel which uses a movable pin and roller to wind the line about the spool. The moveable pin may be released to allow uncoiling of the wrapped line from the spool. The spool remains stationary as the line is withdrawn by the arrow. In this way, the inertia of the spool and contained line does slow the arrow. The user may forget to release the pin. In these circumstances, the line may break or the arrow may stretch the line and recoil striking the shooter. The process of winding the line on the spool and then releasing it without unwinding of the spool imparts a twist to the line that may make it prone to tangling.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which.

DETAILED DESCRIPTION OF THE ILLUSTRATED EMBODIMENT

Figure 1:
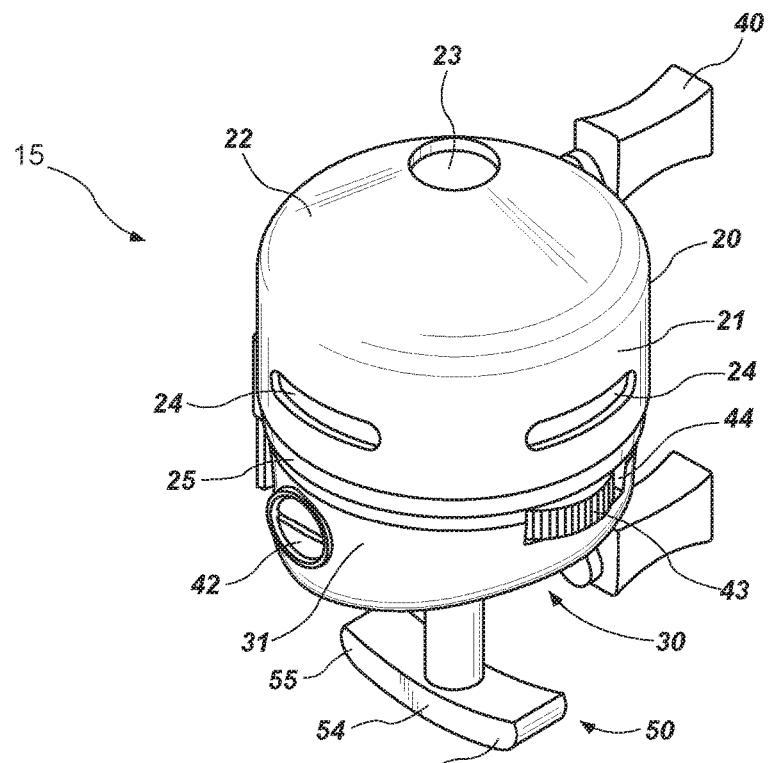
FIG. 1 is a top perspective view of a fishing reel in accordance with one aspect of the technology.
Figure 2:
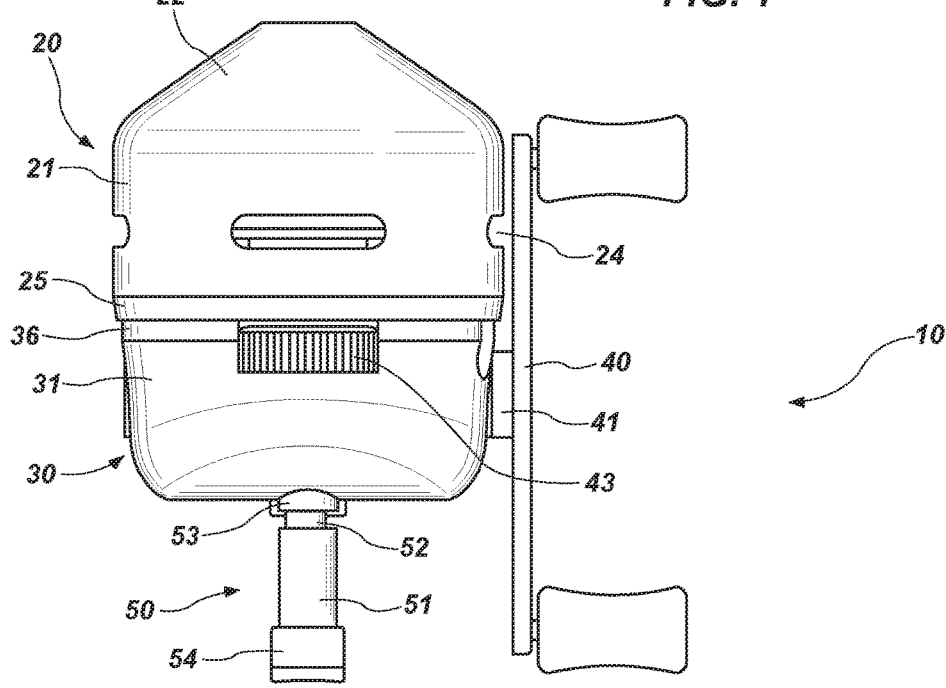
FIG. 2 is a front view of a fishing reel in accordance with one aspect of the technology.
Figure 3:
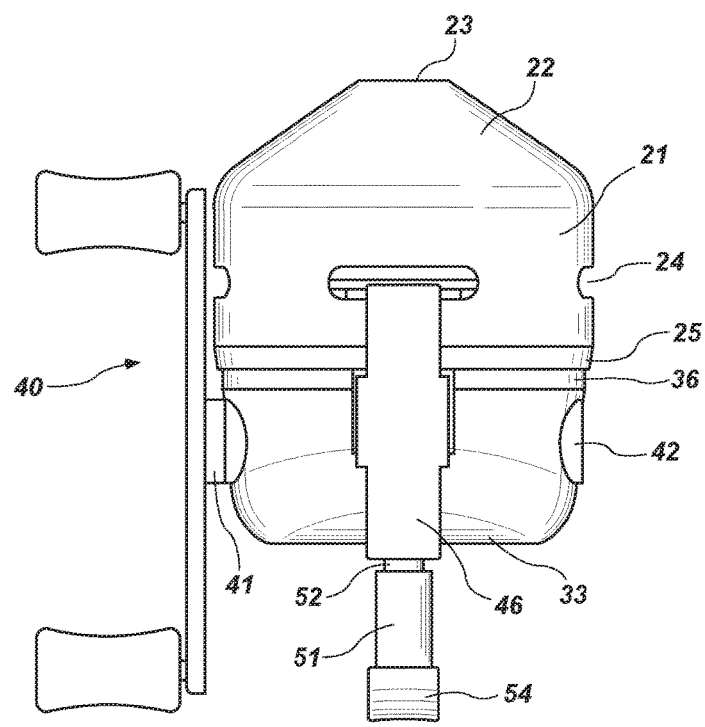
FIG. 3 is back view of a fishing reel in accordance with one aspect of the technology.
Figures 4, 5:
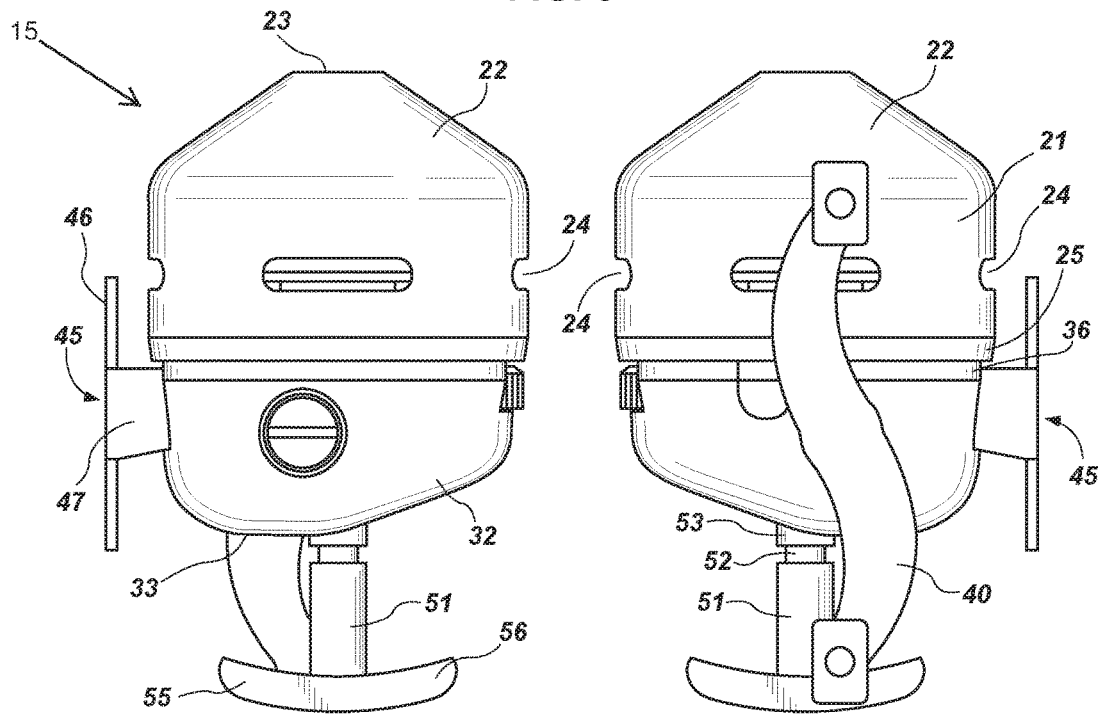
FIG. 4 is a side view of a fishing reel in accordance with one aspect of the technology.
FIG. 5 is an opposite side view of the fishing apparatus of FIG. 4.
Figure 6:
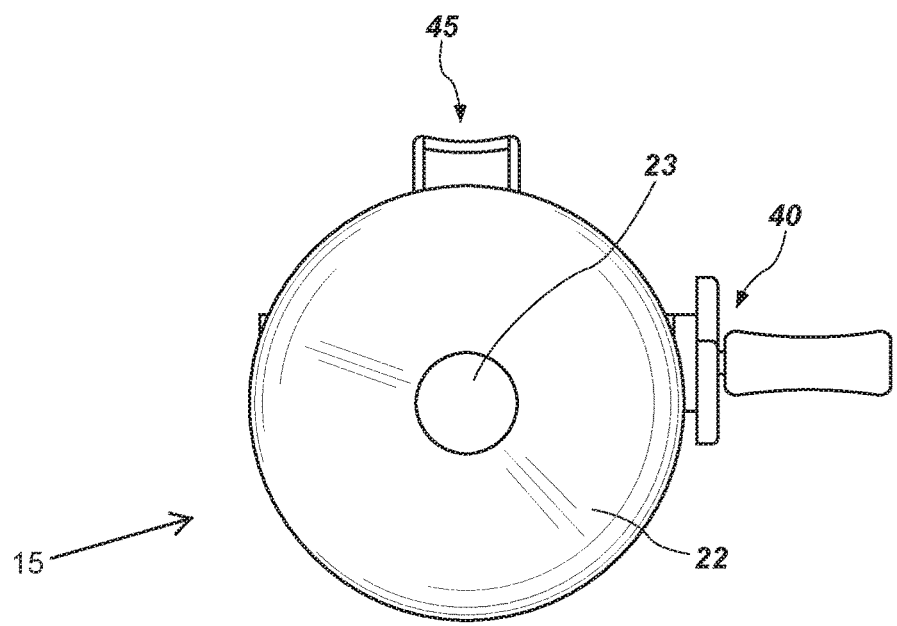
FIG. 6 is top of view of a fishing reel in accordance with one aspect of the technology.
Figure 7:
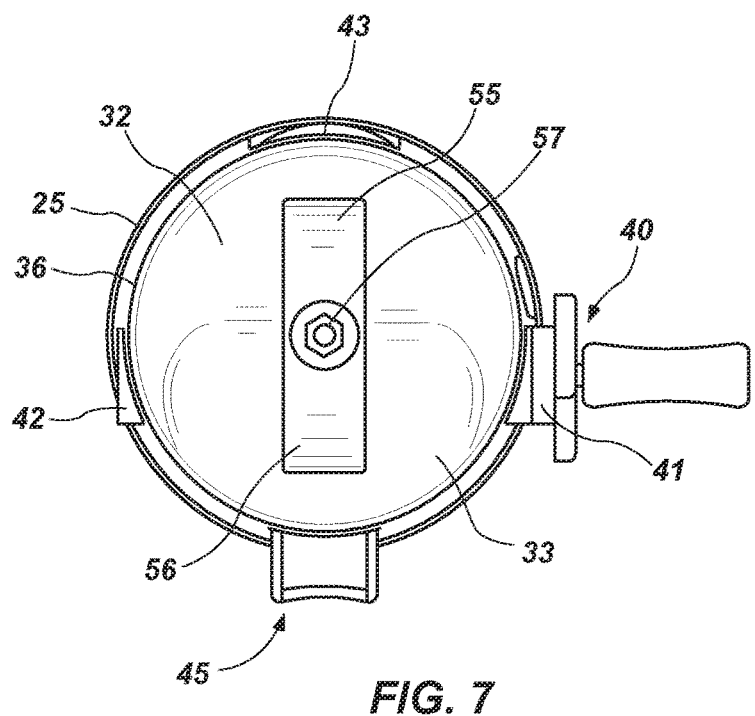
FIG. 7 is bottom view of a fishing reel in accordance with one aspect of the technology.
Figure 8:
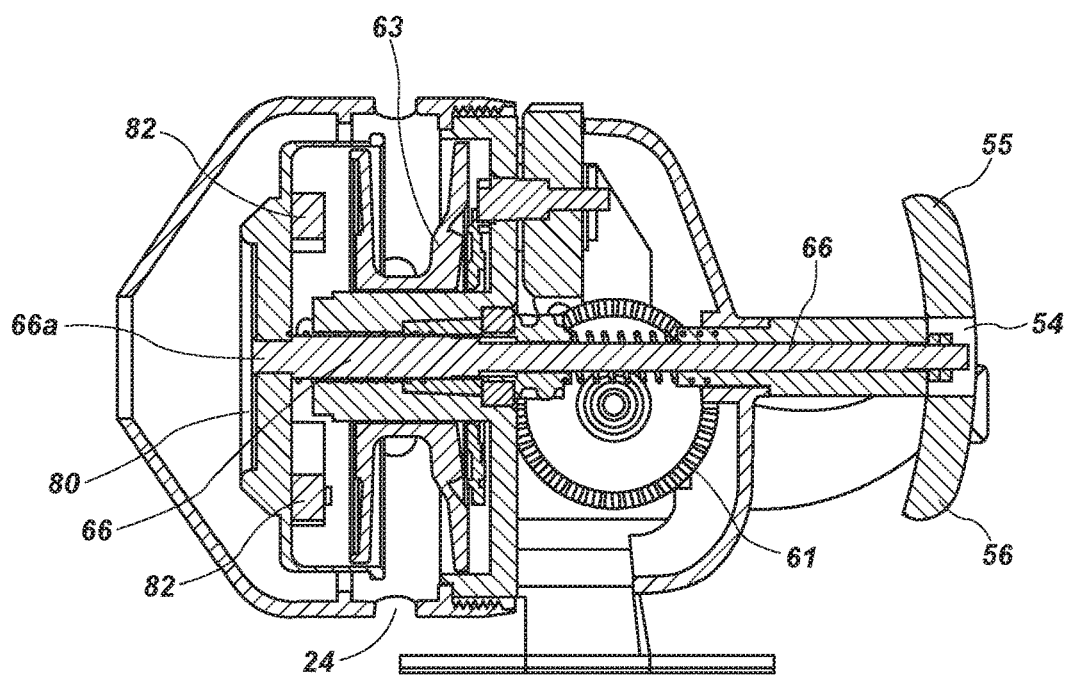
FIG. 8 is side view of a fishing reel in a closed position in accordance with one aspect of the technology.
Figure 9:
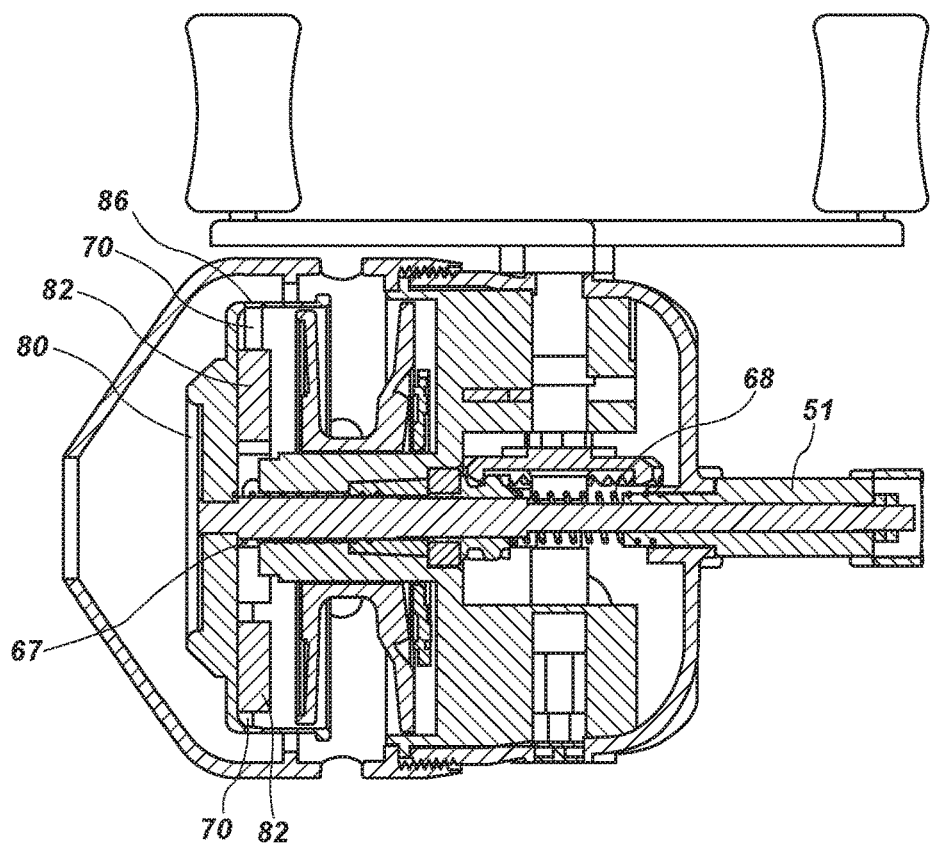
FIG. 9 is top view of a fishing reel in a closed position accordance with one aspect of the technology.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

External View and Operation

Generally speaking, the present technology resides in a bowfishing reel that provides for easy release of the locking mechanism that prevents payout of fishing line from the reel. Referring specifically to FIGS. 1-7, a fishing line reel 10 for storing and paying out fishing line, comprises a housing 15 with a first housing portion 20 coupled to a second housing portion 30. The first housing (referred to herein as the first housing portion or the first housing 20) has a generally cylindrical base 21 and a generally frustroconical top 22. The top 22 of the first housing 20 comprises a circular aperture 23. A plurality of the stadium-shaped apertures 24 are disposed about the sides of the cylindrical base 21. A stadium is a two-dimensional geometric shape constructed of a rectangle with semicircles at a pair of opposite sides. Alternative names include discorectangle and obround. The cylindrical base 21 of the first housing 20 comprises a bottom 25 having an outer perimeter that is less than an outer perimeter of the cylindrical base 21.

In accordance with one aspect of the technology, the first housing 20 is coupled to a second housing (or second housing portion) 30, though the housing 15 may be an integrated housing with integrated first and second portions. The second housing 30 comprises a generally cylindrical base 31 having a truncated portion 32 towards a bottom 33 of the second housing 30. The truncated portion 32 terminates in a substantially planar extreme bottom portion 34. In accordance with one aspect of the technology, the second housing 30 comprises an outer perimeter near a top 36 of the second housing 30 that is less than an outer perimeter of first housing 20. While the first housing 20 and the second housing 30 are described separating, it is also appropriate to describe them as a first portion 20 and a second portion 30 of a single housing.

A double handed crank arm 40 is disposed about a first side of the fishing reel 10 and is coupled to the second housing 30 by coupling 41. The crank arm 40 has a longitudinal axis that is substantially parallel with a longitudinal axis of the fishing reel 10 and is parallel with an imaginary line through the center of circular aperture 23. A fastener 42 is disposed about the second housing opposite the coupling 41 and aligned coaxially with coupling 41. In one aspect of the technology, the fastener 42 and coupling 41 are disposed off-center from a center of the second housing 30. In accordance with another aspect, a dial 43 is disposed within rectangular aperture 44 about another side of the second housing 30. A mount 45 is disposed about the side of the second housing opposite the dial 43. Mount 45 permits the user to mount the fishing reel 10 on a reel seat which can then be mounted the bow to adjust the reel in a horizontal fashion to accommodate different hand sizes. The mount 45 limits vertical movement, however, to ensure proper reel alignment with the bow thereby minimizing potentially hazardous misalignment of an arrow and the fishing reel 10. The mount 45 comprises a substantially flat mounting surface 46 that is disposed substantially parallel with a longitudinal axis of the fishing reel 10 and is coupled to the second housing 20 by way of a coupling 47 that is oriented perpendicular to the flat mounting surface 46.

In accordance with one aspect of the technology, a handle 50 is coupled to the second housing 20 about the bottom surface of the second housing 20. In one aspect, the handle 50 can be described generally as T-shaped in that it comprises a post 51 coupled to an outer shaft 52 each disposed parallel to a longitudinal axis of the fishing reel 10. In one aspect, the post 51 and rod 52 are disposed coaxially with a center of aperture 23. The outer shaft 52 is coupled to a cylindrical mounting body 53 that is disposed about the bottom of second housing 20. A rectangular grip 54 is disposed about proximal end of post 51 and is oriented perpendicular to the post 51 and perpendicular to a longitudinal axis of fishing reel 10 with gripping sides 55 and 56 disposed on either side post 51. In one aspect of the technology, the grip 54 has a curvilinear shape and is secured to the post 51 by way of fastener 57.

Internal View and Operation

With reference generally to FIGS. 1-7, and more specifically to FIGS. 8-11, the housing 15 of fishing line reel 10 comprises a cavity that houses components (e.g., a crank assembly and a line spool, etc.) for collecting and releasing fishing line. Broadly speaking, while the fishing line reel 10 may be used in connection with conventional fishing rods, it may also be used in connection with a bow for bowfishing. A bowfishing bow includes limbs and a bow riser which provides a grip for the user's hand. The fishing line reel 10 is used for storing and paying out fishing line and is attached to the bow riser. In one aspect of the technology, the double handed crank arm 40 is coupled to an axle 60 oriented perpendicular to a longitudinal axis of the reel 10. The axle 60 is coupled to a first gear 61 which in turn is coupled to a second gear 62 that is operably coupled to a cap 80 (or spinner head) and a line spool 63. The crank arm 40 is configured so that as a user turns the arm 40 (either by using the arm handles 49 or otherwise), the cap 80 is rotated relative to the line spool 63.

Generally speaking, the fishing reel 10 (and more specifically the cap 80 of the fishing reel 10) has an open position and a closed position. The fishing reel 10 is shifted between the open and closed positions by virtue of an actuator assembly. When the fishing reel is in a closed position (see, e.g., FIGS. 8 and 9), a retractable pin 70 disposed about the cap 80 is extended laterally away from the cap 80 and line spool 63 in a direction that is perpendicular to a longitudinal axis of the fishing reel 10. In the closed position, the cap 80 operates to stop the fishing line from free spooling (i.e., freely being removed from the line spool) and allows the user to rotate the crank arm 40 to retrieve the fishing line. In one aspect of the technology, the actuator assembly comprises a center shaft 66 (sometimes referred to as the center axle) extends through a center of the housing 15, a center of the line spool 63, and out the back of the housing 15 to couple to handle 54.

In one aspect of the technology, the center shaft 66 is coupled to outer shaft 52. In another aspect, however, the outer shaft 52 extends into the housing 15 and acts as the center shaft 66. In other words, in one aspect, the outer shaft 52 shown generally in FIGS. 2-5 is the center shaft 66. In this manner, the center shaft 66 (or outer shaft 52) operates in conjunction with post 51 and handle 54 to slide the center shaft 66 in and out of the housing 15. First and second springs 67, 68 are disposed about a front portion of the center shaft 66 and middle portion of the center shaft 66. The second spring 68 abuts against a sleeve 69 on one end and a face of second gear 62 on its other end. The first spring 67 operates in conjunction with the handle 54 and the cap 80 to retract and extend pin 70.

Figure 10:
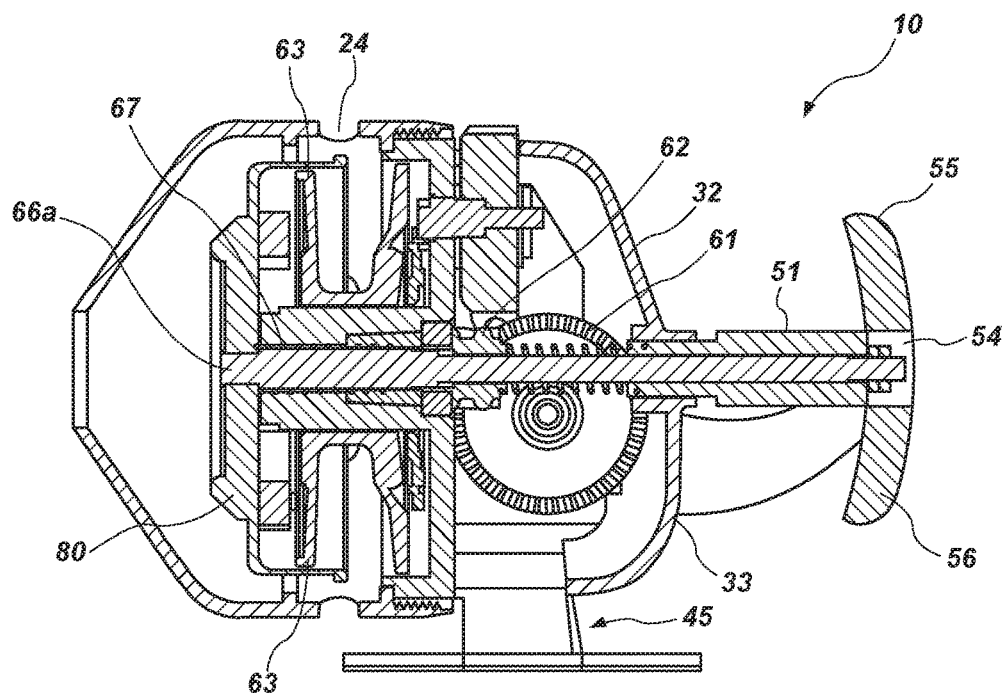
FIG. 10 is side view of a fishing reel in an open position in accordance with one aspect of the technology.
Figure 11:
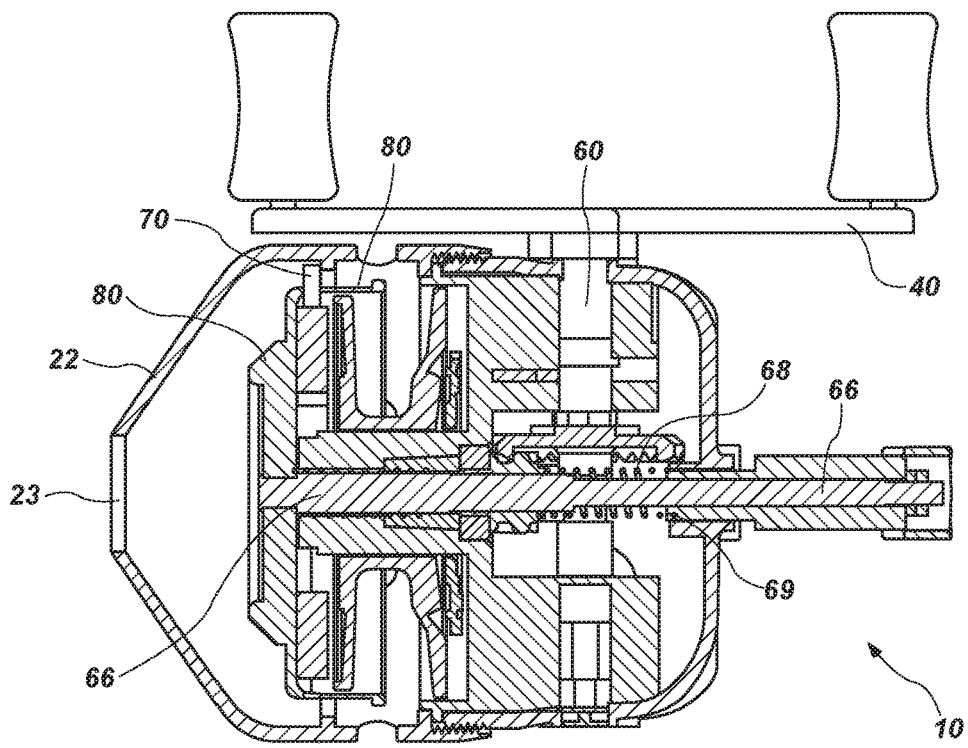
FIG. 11 is top view of a fishing reel in an open position in accordance with one aspect of the technology.

In one aspect of the technology, when the cap 80 is in a closed position, the retractable pin 70 extends outwardly in a direction that is perpendicular to the center shaft 66. The handle 54 is extended outwardly away from the housing while line spool is in the closed position. In this position, the first spring 67 is in a state of compression pushing against the bottom of cap 80. An engagement assembly (discussed below) extends the retractable pin 70 outside of apertures within the cap 80. When the handle 54 is pushed inward, the compression in the first spring 67 is released and the cap 80 moves forward. Once the cap 80 moves forward, the retractable pin 70 is fully retracted into the cap 80 as shown in FIGS. 10 and 11. When the retracting pin 70 is retracted (i.e., the line spool is in the open position), fishing line may be freely removed from the line spool 63. In operation, when preparing to release an arrow from the bow, the user would push the handle 54 forward to retract the pin 70 so the line may payout freely from line spool 63 without any rotation of the line spool 63. Once the arrow is released and has reached its target, the user pulls the handle 54 outward and rotates the crank arm 40 which extends the pin 70 and moves the line spool into a closed position, preventing the fishing line from unspooling and allowing the user to rotate the crank 40 to retrieve the line and any arrow attached thereto.

Figure 12:
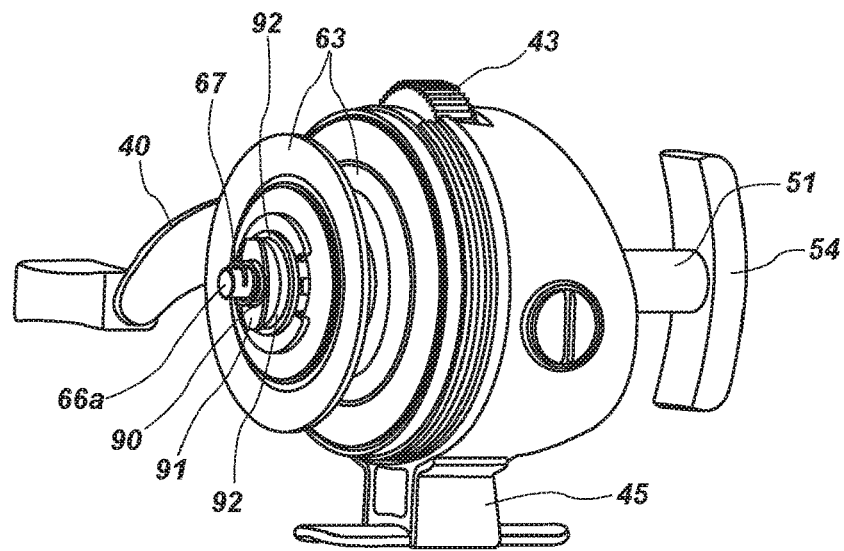
FIG. 12 is top view of a fishing reel with a cap removed in accordance with one aspect of the technology.
Figure 13:
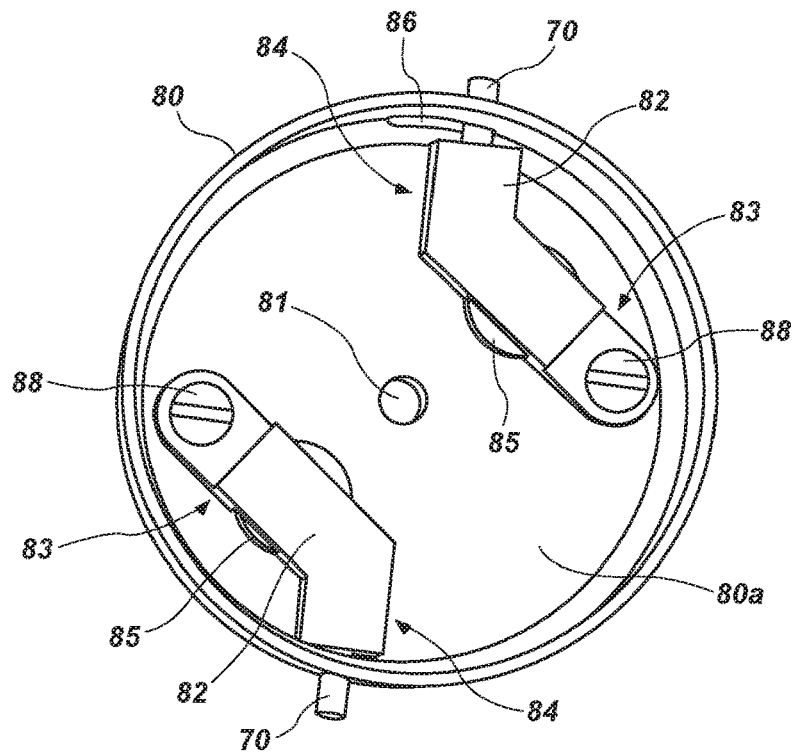
FIG. 13 is bottom view of a cap of a fishing reel in accordance with one aspect of the technology.

With specific reference to FIGS. 12 and 13, in accordance with one aspect of the technology, the first spring 67 is operably coupled to the retracting pin 70 by virtue of its interaction with cap 80. Cap 80 comprises a center aperture 81 that is configured to be disposed on top of line spool 63. The top 66a of center shaft or center axle 66 is configured to fit through center aperture 81 and be secured to the cap 80. A bottom 80a of the cap 80 comprises a pair of opposing arms 82 secured on a first end 83 of the arm to the bottom 80a of cap 80 by a fastener 88. A second end 84 of the arm 82 is moveable with respect to the first end 83. The retractable pin 70 is disposed on the second end 84 of the arm 82. A wheel or disk 85 is disposed between the arm 82 and the bottom 80a of the cap 80 and is configured to operate with an oblong protrusion 90 extending from center pole 92 to displace the second end 84 of the arm 82 when the cap 80 is in a lowered position (i.e., when the reel is in a closed position). Oblong protrusion 90 and center pole 92 form part of an engagement assembly that engage the arms 82 to displace them and the pins 70 from their resting position.

Put another way, when the reel is in an open position, the cap 80 is moved away from the top of the line spool 63. When the reel 10 is in a closed position, the cap 80 is moved towards the top of the line spool 63. In a closed position, the cap 80 is oriented such that oblong protrusion 90 is disposed between the ends of the disks 85. When the crank arm 40 is rotated, the gears rotate the cap 80 about the oblong protrusion 90. As the cap 80 is rotated, ends 91 of oblong protrusion 90 come into contact with the ends of disks 85 causing them to be displaced outwards thereby extending pins 70 through aperture 86. When the disks 85 are displaced by the ends 91 of oblong protrusion 90, the cap 80 moves farther towards the top of the line spool 63 as the ends of the disks 85 slide downward over the outside of center post 92. Once the disks 85 are located about the outside of center post 92, the pins 70 remain fully extended through aperture 86 until the handle 54 is pushed inward. When the handle 54 is pushed inward, the cap 80 is moved away from the top of the line spool 63. When it is moved away from the line spool, the arms 82 are no longer in contact with the pin engagement assembly (i.e., the oblong protrusion 90 and center post 92). As such, the arms 82 move back into a resting state. Consequently, the pins 70 retract back into the cap 80.

It is noted that no specific order is required in these methods unless required by the claims set forth herein, though generally in some embodiments, the method steps can be carried out sequentially. Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A bowfishing reel, comprising:
a housing comprising a generally cylindrical first portion having an aperture disposed about a center top portion of the cylindrical first portion, wherein the housing comprises a generally cylindrical second portion disposed about a bottom of the first portion and wherein the second portion of the housing has an outer perimeter that is less than an outer perimeter of the first portion of the housing and wherein a bottom of the second portion is substantially planar;
a crank arm disposed about a side of the housing, said crank arm comprising a mount that is disposed perpendicular to a longitudinal axis of the housing;
a handle disposed about the bottom of the second portion, said handle comprising a post disposed coaxial with a center of the aperture and further comprising a grip coupled to a distal end of the post and disposed perpendicular to the post, wherein the grip comprises a front and a back, the front having a radius of curvature equivalent to a radius of curvature of the back; and
wherein the crank arm is mounted on a first side of the housing, the reel further comprising a fastener disposed on a second side of the housing and coaxially with the mount of the crank arm.

2. The bowfishing reel of claim 1, wherein the handle is T-shaped.

3. The bowfishing reel of claim 1, wherein the grip comprises a rectangular end disposed on opposing sides of the post oriented perpendicular to a longitudinal axis of the reel.

4. The bowfishing reel of claim 1, wherein a second portion of the crank arm is coupled to the reel about the second portion of the housing.

5. The bowfishing reel of claim 1, wherein the second portion of the housing comprises a truncated end.

6. A bowfishing reel, comprising:
a housing comprising a generally cylindrical first portion having an aperture disposed about a center top portion of the cylindrical first portion, wherein the housing comprises a generally cylindrical second portion disposed about a bottom of the first portion and wherein the second portion of the housing has an outer perimeter that is less than an outer perimeter of the first portion of the housing;
a crank arm disposed about a side of the housing, said crank arm comprising a mount that is disposed perpendicular to a longitudinal axis of the housing;
a T-shaped handle disposed about a bottom of a second portion, said handle comprising a post disposed coaxial with a center of the aperture and further comprising a grip coupled to a distal end of the post and disposed perpendicular to the post, wherein the grip comprises a front and a back, the front having a continuous radius of curvature that is equivalent to a continuous radius of curvature of the back; and
wherein the crank arm is mounted on a first side of the housing, the reel further comprising a fastener disposed on a second side of the housing and coaxially with the mount of the crank arm.

7. A bowfishing reel, comprising:
a housing having a generally cylindrical first portion and an aperture disposed about a center top portion of the cylindrical first portion;
a crank arm disposed about the side of the housing, said crank arm comprising a mount that is disposed perpendicular to a longitudinal axis of the housing operably coupled to a line spool;
a T-shaped handle disposed about a bottom of the second portion, said handle comprising a post disposed coaxial with a center of the aperture and further comprising a grip coupled to a distal end of the post and disposed perpendicular to the post;
an actuator assembly coupled to the T-shaped handle comprising a center shaft and a spring operably coupled to a cap disposed about a top of a line spool, said actuator assembly configured to move the cap toward the line spool when the actuator is in a closed position and further configured to move the cap away from the line spool when the actuator is in an open position; and
a drive shaft coupled to an axle and further coupled to the cap, said drive shaft configured to rotate the cap when the axle is rotated.

8. The bowfishing reel of claim 7, wherein the line spool comprises a center post disposed on top of the line spool and rotatable with the line spool.

9. The bowfishing reel of claim 8, further comprising an oblong protrusion disposed on top of the center post.

10. The bowfishing reel of claim 9, wherein the cap comprises a plurality of opposing arms, each arm having a fixed first end and a moveable second end, the second end being moveable with respect to the first end.

11. The bowfishing reel of claim 10, wherein each of the opposing arms comprises a disk fixed to the arm.

12. The bowfishing reel of claim 11, wherein each of the opposing arms comprises a pin disposed about a distal end of the opposing arms, the pin being extendable through an aperture disposed within the cap.

13. The bowfishing reel of claim 12, wherein when the actuator is in the closed position, the oblong protrusion is disposed between the opposing arms, wherein when the crank arm is rotated, the cap rotates causing the opposing arms to be displaced, extending the pins through the aperture of the cap.

14. The bowfishing reel of claim 13, wherein when the actuator is in a closed position, the opposing arms are disposed about opposing sides of center post maintaining the opposing arms in a displaced state and maintaining the pins through the aperture of the cap.

15. The bowfishing reel of claim 12, wherein when the actuator is in an open position, the opposing arms are disposed in a resting state and the pins disposed within an internal cavity of the cap.

16. The bowfishing reel of claim 12, wherein each of the opposing arms is fixed to a bottom of the cap.

17. The bowfishing reel of claim 11, wherein when the actuator is in the closed position, the oblong protrusion is disposed between the opposing arms and wherein when the crank arm is rotated, the cap rotates about the oblong protrusion displacing the opposing arms by engaging and moving the disks fixed to each of the opposing arms.

* * * * *